W. D. SCHOOLEY.
Straw Cutter.
No. 60,069.
Patented Nov. 27, 1866.
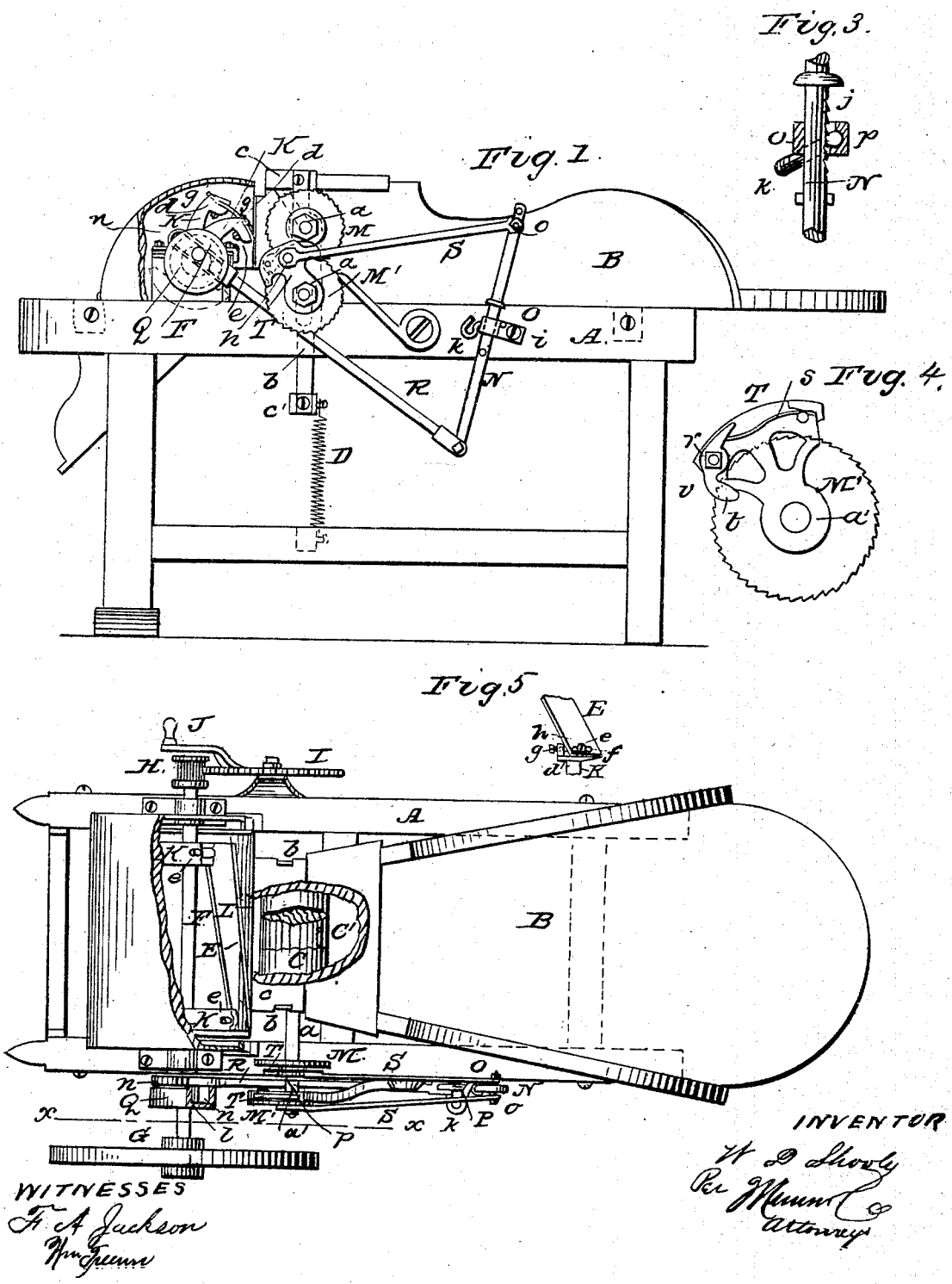

United States Patent Office.

IMPROVEMENT IN STRAW CUTTERS.

W. D. SCHOOLEY, OF RICHMOND, INDIANA.

Letters Patent No. 60,069, dated November 27, 1866.

SPECIFICATION.

TO ALL WHOM IT MAY CONCERN:

Be it known that I, W. D. SCHOOLEY, of Richmond, in the county of Wayne, and State of Indiana, have invented certain new and useful improvements in Straw and Fodder Cutters; and I do hereby declare that the following is a full, clear, and exact description thereof, which will enable others skilled in the art to make and use the same, reference being had to the accompanying drawings, forming part of this specification, in which—

Figure 1 is a side view of my invention, the cutter shaft being in section as indicated by the line $xx$, fig. 2.

Figure 2, a plan or top view of the same partly in section.

Figure 3, an enlarged detached view of a portion of a lever pertaining to the feed mechanism, with the vibrating box and self-adjusting pawl, the box and pawl being in section.

Figure 4, an enlarged inner side view of one of the vibrating radius plates of the feed mechanism with its pawl and spring attached.

Similar letters of reference indicate like parts.

This invention relates to certain new and useful improvements in that class of straw and fodder cutters which are provided with a rotary knife or cutter, working over a stationary knife; and the invention consists in a novel construction and arrangement of parts pertaining to the feed mechanism, whereby the same may be readily adjusted, to admit of the fodder being cut into pieces of greater or less length, as may be required, and all the parts pertaining to the feed mechanism rendered strong and durable. The invention is an improvement on a straw and fodder cutter patented by me August 22, 1865.

A represents the framing of the machine, which may be constructed in any proper manner to support the working parts; and B is the feed box placed on the framing, A, and having two feed rollers, C C', in its front or discharge end; said rollers being placed one over the other, the lower roller having its shaft $a'$, in fixed bearings, and the shaft $a$, of the upper roller, fitted in sliding bearings, $b$, which extend down one at each side of the front part of the feed box, B, are connected at their upper and lower ends by cross-bars, $c c'$, the lower one, $c'$, being connected by a spring, D, to the lower part of the framing A, said spring having a tendency to keep the upper roller C', down upon the lower roller C, and cause the rollers to bite or press the substance being cut sufficiently hard to insure the same being fed to the rotary knife, E, hereinafter described. F represents a shaft which is placed transversely on the framing A, in front of the discharge end of the feed box, B, and has a fly-wheel, G, on one end of it, and a pinion, H, on the opposite end, into which pinion H a toothed wheel, I, gears, the driving power being applied to said wheel through the medium of a crank J, or other means. The shaft F has two arms, K K, firmly keyed upon it, the shaft passing about centrally through said arms, the latter having heads $d$ projecting from them at one end, on which a knife E is secured by screws, $e$, the latter passing through the heads $d$, and through oblong slots $f$, in the knife or in the heads, the knife being adjusted by set-screws, $g g$, which pass through lips $h$, at the rear ends of the heads and bear against the rear edge of the knife, (see fig. 5.) By this arrangement the knife E may be set with the greatest facility, so that its cutting edge may work snugly over a stationary knife, L, at the discharge end and bottom part of the feed box, B. This adjustment of the knife E is necessary in order to compensate for wear of the stationary knife, L. The shafts $a a'$ extend out considerably beyond the side of the feed box B, and have each a ratchet-wheel upon them, the ratchet M', of the lower roller shaft, $a'$, being further out from the feed box than the ratchet M, on the upper roller shaft, $a$, as shown in fig. 2. N is a lever, which is fitted in a box, O, secured to one side of the framing, A, by a pivot or screw, $i$, which admits of said box working or vibrating to a certain extent. The lever N is fitted loosely in the box, O, and it has a rack $j$ formed in it at its centre, (see fig. 3,) and into the free or disengaged end of the box O, a pawl P passes, which engages with the rack $j$, and retains or holds the lever N in position. This pawl is bent at its outer end, in crank form, as shown at $k$, said crank serving as a weight to cause the pawl to adjust or engage itself with the rack, $j$. The lever N may be raised in the box, O, by simply pulling it up, the pawl P not preventing the upward movement of the rack, $j$, but holding the lever or preventing it from descending only. When it is desired to lower lever N, the pawl P is thrown out of gear with rack $j$. The lever N has an oscillating or vibratory movement given it from the shaft, F, the latter having an eccentric, Q, upon it, provided with an annular groove $l$, at one side, in which groove a pin, $m$, from a rod, R, is fitted and works, the end of rod R beyond the pin being made in the form of a loop, $n$, for the shaft F to pass through said loop, serving as a guide for the rod, R the lower end of which is pivoted to the lower end of the lever, N. The upper end of the lever N has two rods, S S, connected to it, by a pivot o, and these rods are connected by pivots p to radius plates, T T, fitted on the roller shafts, a a', and allowed to work or turn freely thereon. To the inner side of each radius plate, T, there is attached by pivot r a pawl U, and these pawls engage with the ratchet-wheels, M M', being kept in contact therewith by springs s, as shown clearly in fig. 4. The pawls U are provided at their ends, which are out from the plates T, with pendent lips, t, which prevent the pawls from slipping or working off from the ratchets.

It will be seen from the above description that the feed motion is communicated to the rollers, C C', by the action of the pawls U on the ratchet-wheels, M M', the pawls being operated by the movement of the radius plates, T, which are actuated by the rods S S, from the upper end of the lever, N, the latter being actuated by the rod R, from the shaft F, through the medium of the eccentric, Q, and pin, M. The rollers, C C', it will be seen, have an intermittent motion, as the pawls, U only engage with the ratchets M M', when moving in one direction, and the feed movement is made to occur after the knife E has passed the knife L, so that the substance being cut will be stationary when the knife E is acting upon it. The feed may be varied, so as to cut the substance into pieces of greater or less length, by raising or lowering the lever, N, by which the length of the stroke of the pawls U may be increased or diminished, increased and the substance cut into larger pieces, when the lever N is raised and decreased, and the substance cut into smaller pieces when said lever is lowered.

Having thus described my invention, what I claim as new, and desire to secure by Letters Patent, is—

1. The vibrating box O, provided with the pawl P, and the lever N, fitted in said box and provided with the rack j, for the purpose of admitting of said lever being readily adjusted higher or lower, to vary the movement of the feed, as occasion may require.

2. The radius plates T, provided with the pawls U, and fitted loosely on the roller shafts a a', in combination with the ratchets M M' on said shafts, and the adjustable lever N, substantially as and for the purpose set forth.

3. The combination of the rod R, operated from the shaft E by the eccentric Q, the adjustable lever N, fitted in the vibrating box O, provided with the pawl P, the rods S S, radius plates T T, with pawls U attached, and the ratchets M M', all arranged to operate substantially in the manner as and for the purpose specified.

W. D. SCHOOLEY.

Witnesses:
    JAMES M. POE,
    BENJ. WICKETT.